United States Patent
Duan et al.

(10) Patent No.: US 7,237,304 B2
(45) Date of Patent: Jul. 3, 2007

(54) HINGE ASSEMBLY FOR FOLDABLE ELECTRONIC DEVICE

(75) Inventors: Chao Duan, Shenzhen (CN); Rui-Hao Chen, Shenzhen (CN); Chia-Hua Chen, Tu-Cheng (TW)

(73) Assignees: Shenzhen Futaihong Precision Industrial Co., Ltd., Baoan District, Shenzhen City (CN); Sutech Trading Limited, Tortola (VG)

( * ) Notice: Subject to any disclaimer, the term of this patent is extended or adjusted under 35 U.S.C. 154(b) by 231 days.

(21) Appl. No.: 11/020,078

(22) Filed: Dec. 21, 2004

(65) Prior Publication Data

US 2005/0188504 A1    Sep. 1, 2005

(30) Foreign Application Priority Data

Feb. 26, 2004   (CN)  .................. 2004 2 0043052

(51) Int. Cl.
*E05D 11/10* (2006.01)

(52) U.S. Cl. ...................... 16/324; 16/338; 16/340; 16/297; 16/326

(58) Field of Classification Search ............. 16/297, 16/338–340, 342, 277, 324, 326, 303, 330, 16/327, 328, 312, 316; 361/680–683; 455/90.3, 455/575.1, 575.3; 379/433.13
See application file for complete search history.

(56) References Cited

U.S. PATENT DOCUMENTS

| | | | |
|---|---|---|---|
| 5,628,089 A | | 5/1997 | Wilcox et al. |
| 5,649,309 A | * | 7/1997 | Wilcox et al. ........... 455/575.3 |
| 5,923,751 A | * | 7/1999 | Ohtsuka et al. ........ 379/433.13 |
| 6,459,887 B2 | * | 10/2002 | Okuda ....................... 455/90.1 |
| 6,658,699 B2 | * | 12/2003 | Huong ........................ 16/330 |
| 6,952,860 B2 | * | 10/2005 | Kawamoto .................... 16/285 |
| 6,985,580 B2 | * | 1/2006 | Lu et al. ................. 379/433.13 |
| 7,007,345 B2 | * | 3/2006 | Nakase et al. ................ 16/330 |
| 2005/0120515 A1 | * | 6/2005 | Kato ............................ 16/221 |
| 2005/0172454 A1 | * | 8/2005 | Chen et al. ................... 16/330 |
| 2005/0220294 A1 | * | 10/2005 | Gupte ................... 379/433.13 |

* cited by examiner

*Primary Examiner*—Chuck Y. Mah
*Assistant Examiner*—Michael J. Kyle
(74) *Attorney, Agent, or Firm*—Morris Manning & Martin LLP; Tim Tingkang Xia, Esq.

(57) ABSTRACT

A hinge assembly includes a central shaft (20), including an outer screw thread (221); a turning element (30), including a central hole (322) and a holding pin (314), an inner screw thread (323) formed at an inner surface of the central hole; a elastic means (40); a blocking element (50), defining a first through hole (51) and a second through hole (52); and a button (71), including a supporting pin (72). The central shaft extends through the central hole of the turning element, the first elastic element, and the first through hole of the blocking element in that order, the outer screw thread engages with the inner screw thread, and the holding pin of the turning element is received in the second through hole of the blocking element. The present invention enables a foldable electronic device to be opened simply by pressing the button.

20 Claims, 5 Drawing Sheets

HINGE ASSEMBLY FOR FOLDABLE ELECTRONIC DEVICE

CROSS-REFERENCE TO RELATED APPLICATIONS

This application is related to U.S. patent application Ser. No. 10/920,760, entitled "HINGE ASSEMBLY FOR FOLDABLE ELECTRONIC DEVICE" and filed on Aug. 17, 2004. The disclosure of the above identified applications is incorporated herein by reference.

BACKGROUND OF THE INVENTION

1. Field of the Invention

The present invention relates to hinge assemblies, and particularly to a hinge assembly for hinging a cover and a body of a foldable electronic device together.

2. Prior Art

Portable electronic devices, such as cellular phones and PDAs (personal digital assistants), are becoming ever more popular with the development of wireless communication technology and data processing technology.

For example, a foldable cellular phone commonly has a cover and a body joined by some type of hinge that allows the cover to fold upon the body. Some foldable phones have most of the electronics provided in the body. The cover normally contains fewer electronic components than the body. Other foldable phones have essentially all the electronics provided in the body, with the cover serving only to cover and protect the keypad and the display of the phone.

U.S. Pat. No. 5,628,089, issued to Wilcox et al. and entitled "Radiotelephone Having a Self Contained Hinge," discloses a hinge for use in a miniaturized radiotelephone. This hinge is represented in FIG. 5. The hinge 80 comprises a spring 82, a cam 83 and a follower 84 assembled into a cylindrically hollow can 81 via an open end thereof, and held in assemblage by a cap 85 coupled to the can 81 over the open end. The hinge 80 can be attached in a cavity of a cover and a cavity of a body of the radiotelephone.

This kind of self contained hinge is desired by many foldable cellular phone manufacturers because it can be purchased as a separate unit, thereby eliminating the steps associated with assembling such hinge during manufacturing. However, a foldable cellular phone with such hinge can be opened automatically only after the cover has first been turned about the body by a user. It is not easy for the user to open the cellular phone with only one hand, for example when the user is driving a car or is otherwise occupied. Furthermore, the cover is prone to open quickly and jar against the body. After repeated use, the body and the cover are liable become worn out and not operate properly.

Thus, a need exists for a convenient and highly reliable hinge assembly which is suitable for use in a foldable electronic device, and which overcomes the above-described problems.

SUMMARY OF THE INVENTION

An object of the present invention is to provide a hinge assembly for a foldable cellular phone, the hinge assembly being highly reliable and operable with a simple key or button.

To accomplish the above-mentioned object, the present invention provides a hinge assembly for joining a body and a cover of a foldable electronic device. The hinge assembly includes a central shaft, including an outer screw thread; a turning element, including a central hole and a holding pin, an inner screw thread formed at an inner surface of the turning element in the central hole; a first elastic means; a blocking element, defining a first through hole and a second through hole; and a button, including a supporting pin. The central shaft is extends through the central hole of the turning element, a first elastic element, and the first through hole of the blocking element in that order, the outer screw thread of the central shaft engages with the inner screw thread of the turning element, a first end of the first elastic means is supported by the blocking element, a second end of the first elastic means is supported by the turning element, and the holding pin of the turning element is received in the second through hole of the blocking element, and corresponds to the supporting pin of the button.

The hinge assembly of the invention enables a foldable cellular phone to be opened simply by pressing a single button. Users can operate the phone conveniently without having to use both hands.

Other objects, advantages and novel features of the invention will be drawn from the following detailed description with reference to the attached drawings, in which:

DETAILED DESCRIPTION OF THE PREFERRED EMBODIMENT

Figure 1:
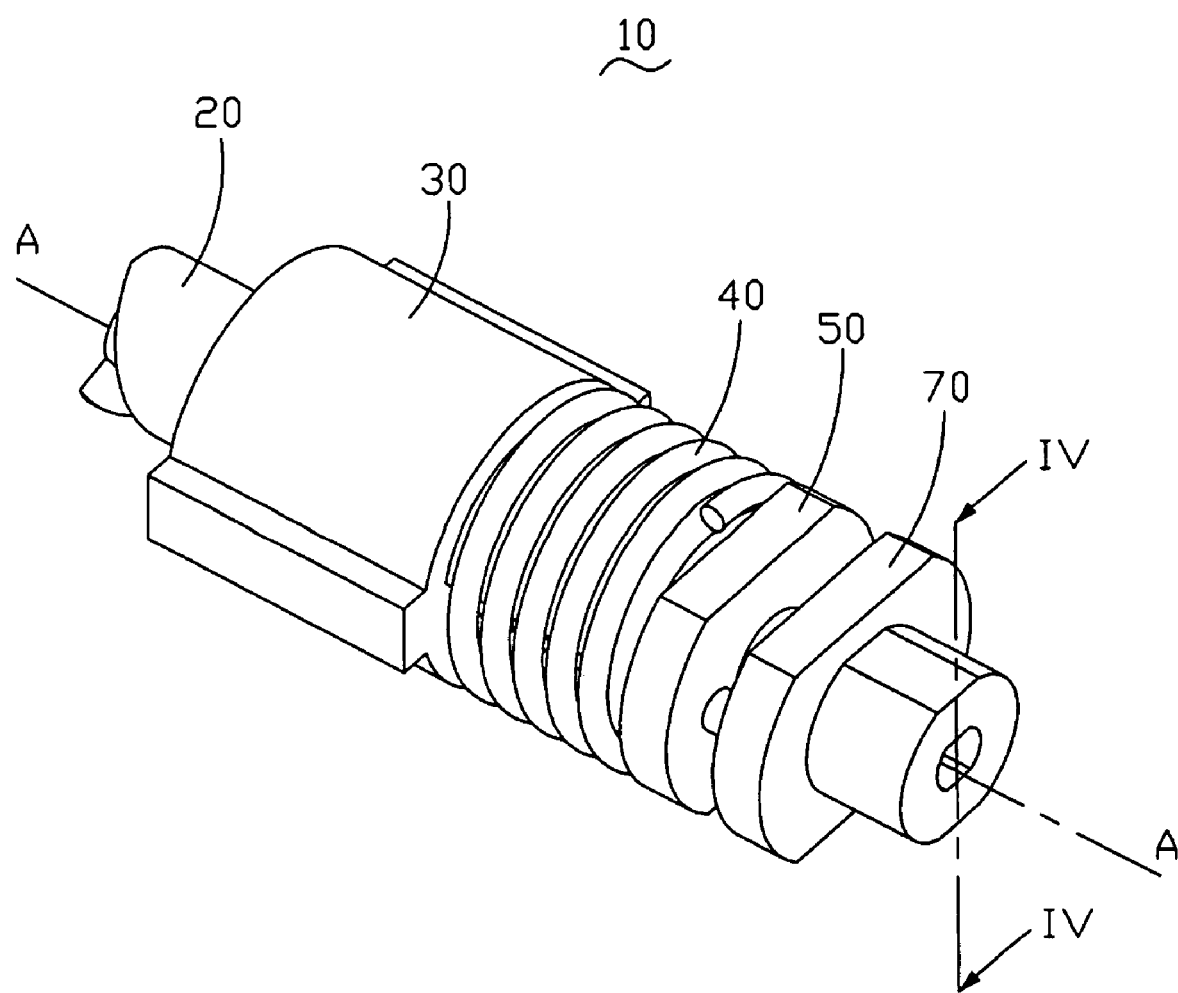
FIG. 1 is an isometric view of a hinge assembly in accordance with the present invention.
Figure 2:
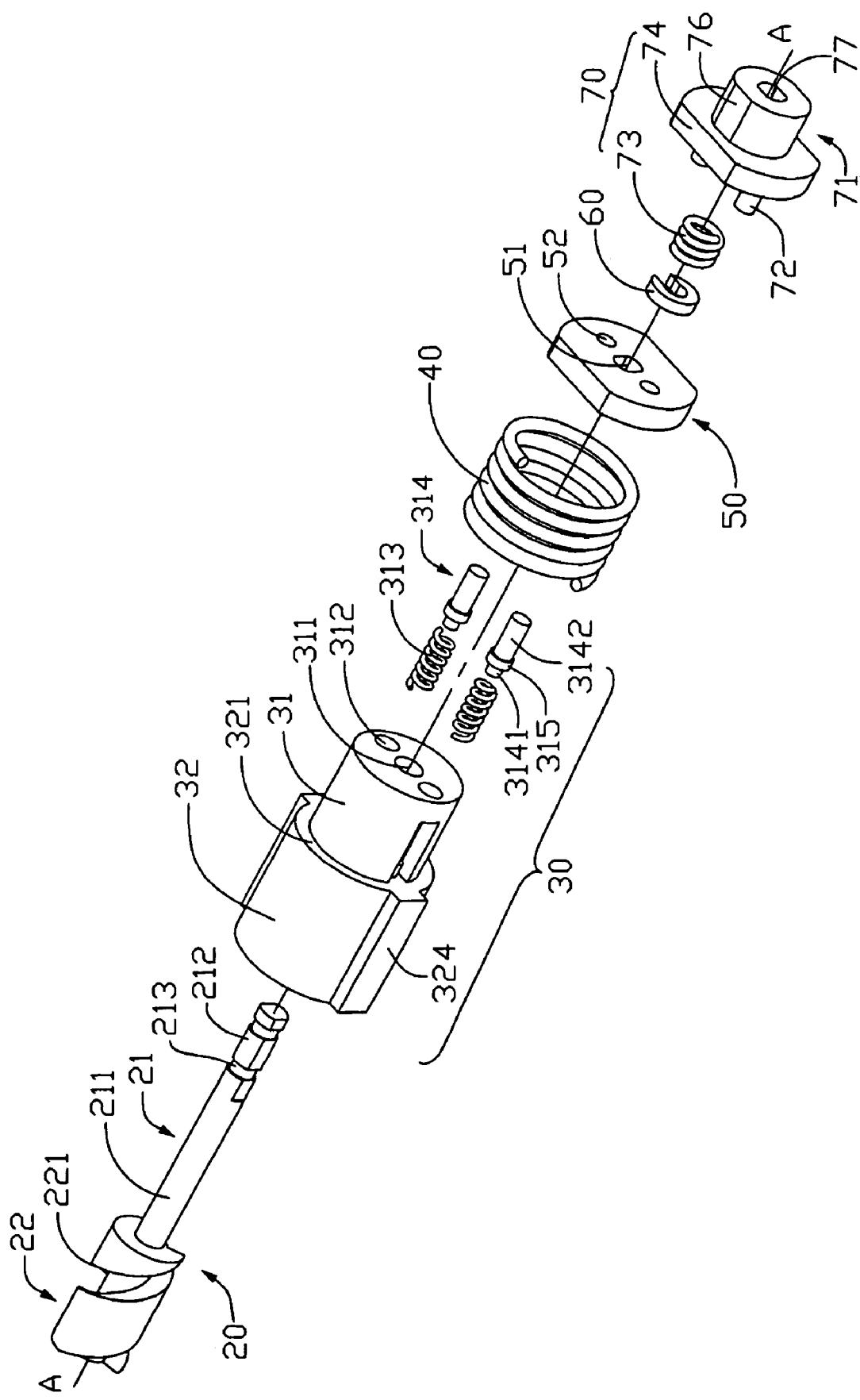
FIG. 2 is an exploded view of the hinge assembly of FIG. 1.
Figure 3:
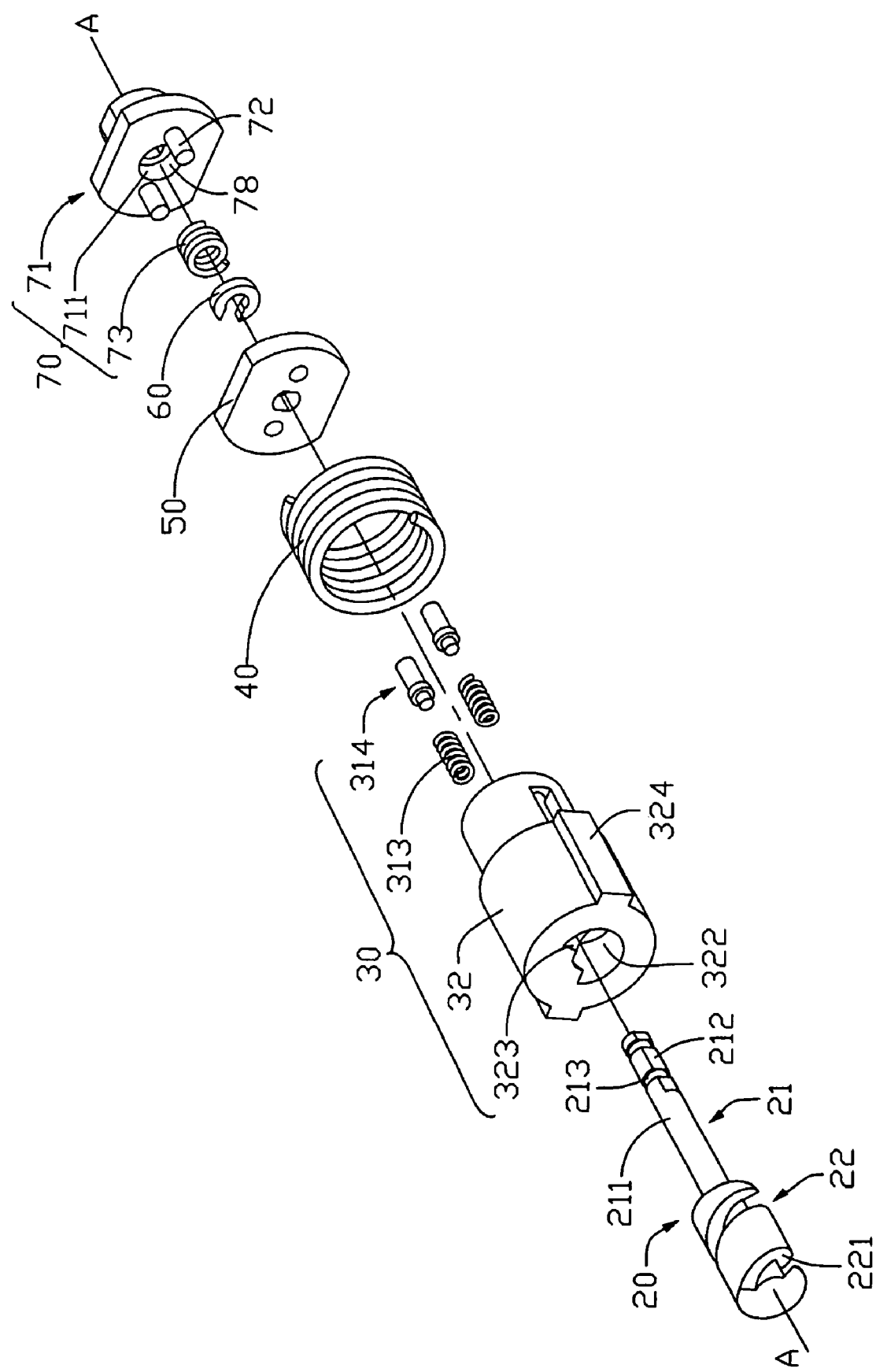
FIG. 3 is similar to FIG. 2, but viewed from another aspect.

An exemplary embodiment of a hinge assembly in accordance with the present invention is shown in FIGS. 1 to 3. The hinge assembly 10 of the present invention is applied to a foldable mobile phone (not shown) with a cover (not shown) and a body (not shown). The hinge assembly 10 includes a central shaft 20, a turning element 30, a helical spring 40, a blocking element 50, a C-shaped fixing clip 60, and a button module 70. The turning element 30, the spring 40, the blocking element 50, the fixing clip 60 and the button module 70 are assembled with the central shaft 20 in that order, and the central shaft 20 connects with the turning element 30 by outer and inner screw threads 221, 323 thereof respectively.

The central shaft 20 of the hinge assembly 10 includes a main body 21, and a connecting head 22 integrally joined with an end of the main body 21. A diameter of the main body 21 is smaller than a diameter of the connecting head 22. The main body 21 includes a main portion 211 and an end portion 212. The main portion 211 is cylindrical, and adjoins the connecting head 21. A peripheral surface of the end portion 212 includes two opposite flat surfaces (not labeled) and two opposite arcuate surfaces (not labeled). An annular fixing groove 213 is defined in the end portion 212. The outer screw thread 221 is formed at a peripheral surface of the connecting head 22.

The turning element 30 is received in a corresponding receiving groove (not shown) of the cover of the mobile phone, and can move along an axis A. The turning element 30 includes a front portion 31 and a rear portion 32. The front portion 31 is cylindrical, and includes a second central hole 311, two receiving sockets 312, two helical springs 313, and two holding pins 314. The receiving sockets 312 are symmetrically defined at opposite sides of the second central hole 311. Two fixing protuberances 318 (best seen in FIG. 4) are formed on the rear portion 32 at bottoms of the receiving sockets 312 respectively. The springs 313 are respectively received in the receiving sockets 312, with rear ends of the springs 313 receiving the fixing protuberances 318 and being supported on the rear portion 32 at the bottoms of the receiving sockets 312. Each holding pin 314 includes a main portion 3142, an annular flange 315, and a connecting portion 3141. An outer diameter of the connecting portion 3141 is less than an inner diameter of each spring 313. The flange 315 interconnects the connecting portion 3141 and the main portion 3142. An outer diameter of the flange 315 is larger than the inner diameter of each spring 313. The holding pins 314 are respectively received in the receiving sockets 312. The connecting portions 3141 of the holding pins 314 are received in the springs 313, with the flanges 315 of the holding pins 314 supporting front ends of the springs 313.

The rear portion 32 of the turning element 30 is cylindrical. An outer diameter of the rear portion 32 is larger than an outer diameter of the front portion 31, so that a step 321 is formed where the rear portion 32 adjoins the front portion 31. The rear portion 32 defines a first central hole 322. The first central hole 322 is coaxial and in communication with the second central hole 311. The inner screw thread 323 is formed on an inner surface of the rear portion 32 in the first central hole 322. Two opposite protuberances 324 are formed on an outer surface of the rear portion 32, for preventing the turning element 30 from rotating in the receiving groove of the mobile phone.

The spring 40 receives the front portion 31 of the turning element 30, and a rear end of the spring 40 is supported by the step 321 of the turning element 30.

The blocking element 50 is fixed in the body of the mobile phone, and supports a front end of the spring 40. The blocking element 50 defines a central first through hole 51 and two opposite second through holes 52. An inner surface of the blocking element 50 in the first through hole 51 has two opposite flat surfaces (not labeled) and two opposite curved surfaces (not labeled). The first through hole 51 corresponds to the central holes 311, 322 of the turning element 30. The first through hole 51 receives the end portion 212 of the central shaft 20, such that the central shaft 20 is prevented from rotating in the first through hole 51. The second through holes 52 correspond to the receiving sockets 312, and receive the main portions 3142 of the holding pins 314.

The button module 70 includes a button 71 and a helical spring 73. The button 71 includes a blocking board 74, a head 76, and two supporting pins 72. The head 76 extends from a front surface of the blocking board 74, and the supporting pins 72 extend from a rear surface of the blocking board 74. A first central through hole 77 is defined in a center of the head 76. A second central through hole 78 is defined in a center of the blocking board 74. The first central through hole 77 is coaxial and in communication with the second central through hole 78. A diameter of the first central through hole 77 is smaller than a diameter of the second central through hole 78, so that an inner step 711 is formed where the first central through hole 77 adjoins the second central through hole 78. The central through holes 77, 78 are coaxial with the first through hole 51 of the blocking element 50. The supporting pins 72 can be inserted into the second through holes 52 of the blocking element 50. The spring 73 is received in the second central through hole 78. A front end of the spring 73 is supported by the step 711. The fixing clip 60 is fixed in the fixing groove 213 of the central shaft 20, and supports a rear end of the spring 73. The button 71 is located in a hole in a sidewall of the mobile phone, with the head 76 of the button 71 protruding beyond an outer surface of the mobile phone.

Figure 4:
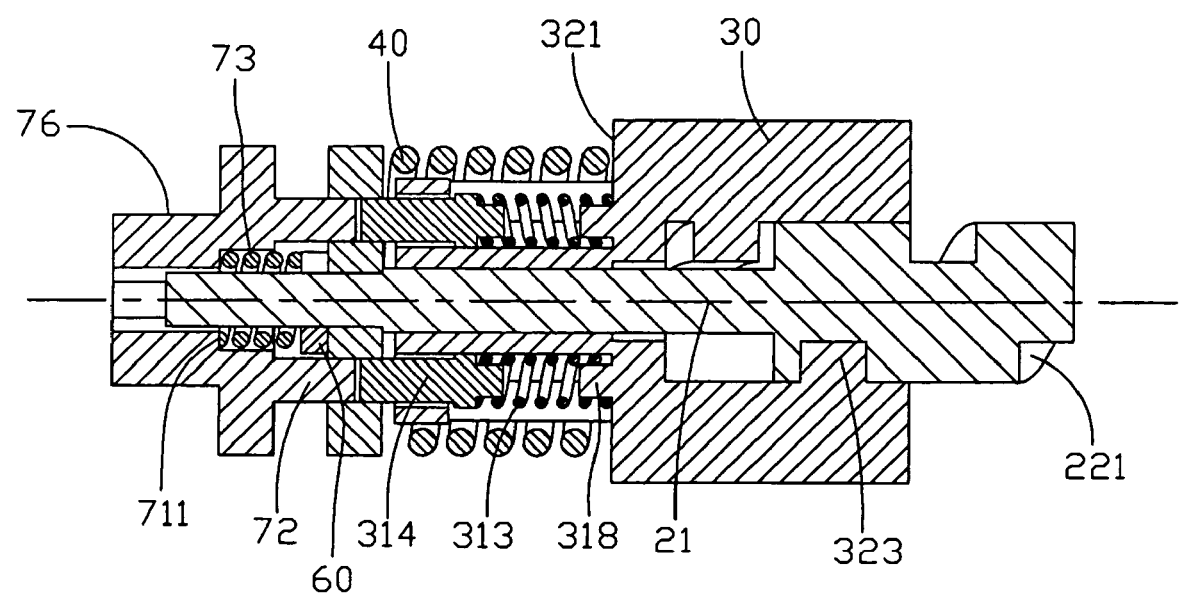
FIG. 4 is a cross-sectional view taken along line IV-IV of FIG. 1.
Figure 5:
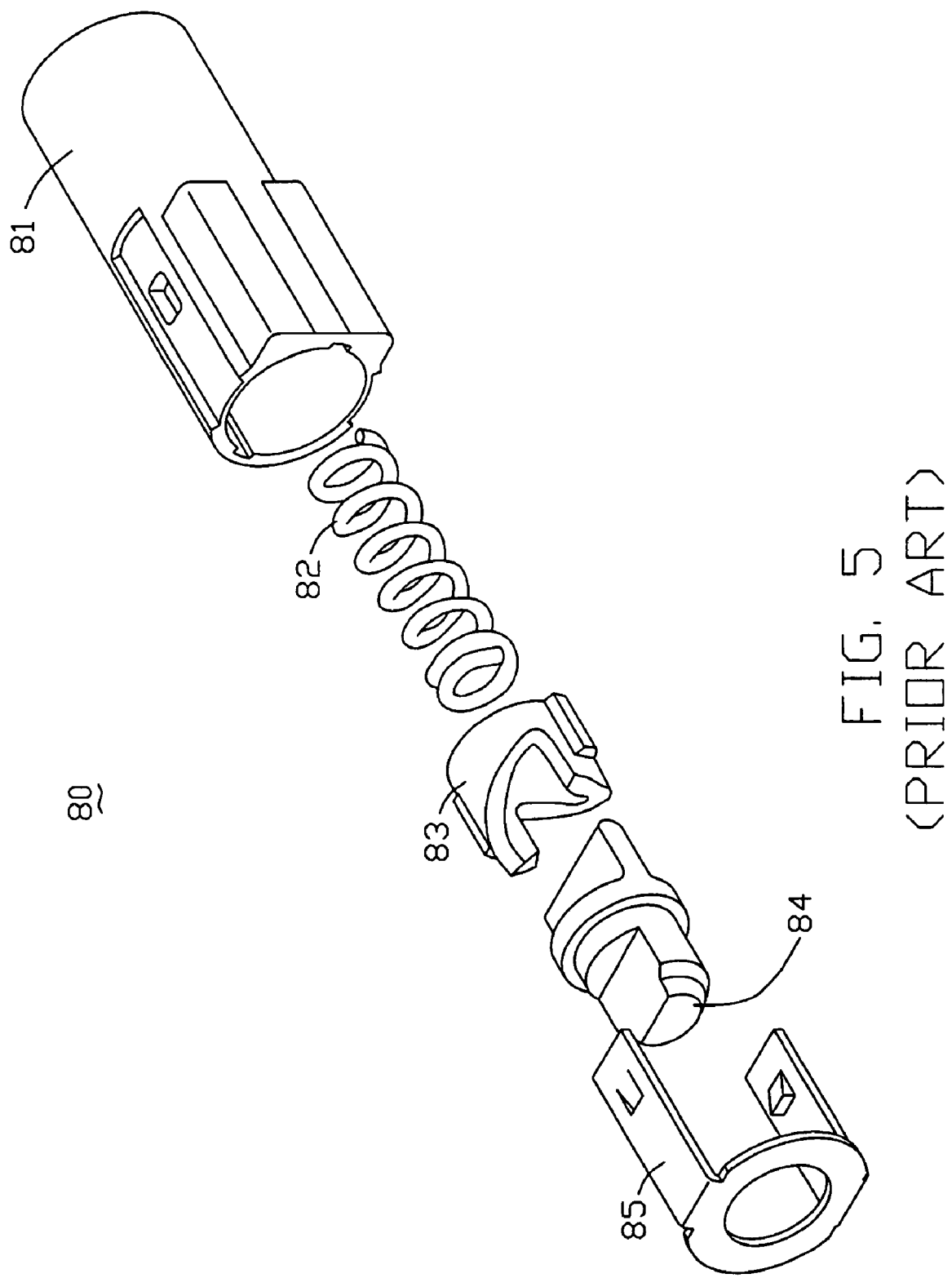
FIG. 5 is an exploded, isometric view of a hinge assembly of the prior art.

Referring to FIG. 4, in assembly of the hinge assembly 10, the central shaft 20 is inserted through the first central hole 322 and the second central hole 311 of the turning element 30, the spring 40, and the first through hole 51 of the blocking element 50. The end portion 212 of the central shaft 20 is held in the first through hole 51 of the blocking element 50. The fixing clip 60 is fixed in the fixing groove 213 of the central shaft 20. The spring 73 and the button 71 are attached around the central shaft 20 in that order. The first central through hole 77 of the button 71 receives the end portion 212 of the central shaft 20. The outer screw thread 221 of the central shaft 20 engages with the inner screw thread 323 of the turning element 30. The main portions 3142 of the holding pins 314 and the supporting pins 72 are partly received in the second through holes 52 of the blocking element 50. At this time, the spring 40 is compressed and supports the turning element 30. The turning element 30 can rotate and move along the axis A by engagement of the outer screw thread 221 of the central shaft 20 with the inner screw thread 323 of the turning element 30. However, because the main portions 3142 of the holding pins 314 are engaged in the second through holes 52 of the blocking element 50, the turning element 30 cannot rotate.

To open the cover of the mobile phone, the head 76 of the button 71 is pressed. The supporting pins 72 of the button 71 push the holding pins 314 and compress the springs 313. The holding pins 314 move deeper into the receiving sockets 312 until the main portions 3142 of the holding pins 314 exit the second through holes 52 of the blocking element 50. At this time, rotation of the turning element 30 is not limited by the blocking element 50. The spring 40 decompresses, and drives the turning element 30 to move rearward along the axis A. Simultaneously, because of the engagement of the screw threads 221, 323, the turning element 30 rotates about the central shaft 20. The cover of the mobile phone is thus driven to an open position.

To close the cover of the mobile phone, the cover is manually rotated. The turning element 30 rotates with the cover and moves forward along the axis A, and the spring 40 is compressed. The cover is thus rotated until the holding pins 314 reach the second through holes 52 of the blocking element 50. At this point, the springs 313 decompress and drive the holding pins 314 into the second through holes 52 until the holding pins 314 abut the supporting pins 72 of the button 71. The cover of the mobile phone is thus returned to and retained in the closed position.

In alternative embodiments, the springs 313, 73 can be replaced by other elastic means such as sponge rubber pieces. The springs 313 can be omitted. That is, the holding pins 314 directly abut the fixing protuberances 318. Alternatively, the holding pins 314 can be integrally formed on the front portion 31 of the turning element 30 at bottoms of the receiving sockets 312 respectively. In any of such alternative embodiments, when the head 76 of the button 71 is pressed, the supporting pins 72 of the button 71 push the holding pins 314 rearward along the axis A until the holding pins 314 exit the second through holes 52 of the blocking element 50. At this time, rotation of the turning element 30 is not limited by the blocking element 50. The spring 40 decompresses, and drives the turning element 30 to move rearward along the axis A. Simultaneously, because of the engagement of the screw threads 221, 323, the turning element 30 rotates about the central shaft 20. The cover of the mobile phone is thus driven to an open position. In further alternative embodiments, the turning element 30 can be received in the body of the mobile phone, and can move along the axis A. The blocking element can accordingly be fixed in the cover of the mobile phone.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A hinge assembly for joining a body and a cover of a foldable electronic device, the hinge assembly comprising:
   a central shaft, comprising an outer screw thread at a second end thereof;
   a turning element, comprising a first central hole and a holding pin, an inner screw thread formed at an inner surface of the turning element in the first central hole;
   a first elastic means;
   a blocking element, defining a first through hole and a second through hole; and
   a button, comprising a supporting pin;
   wherein the central shaft extends through the first central hole of the turning element, the first elastic element, and the first through hole of the blocking element in that order, the outer screw thread of the central shaft engages with the inner screw thread of the turning element, a first end of the first elastic means is supported by the blocking element, a second end of the first elastic means is supported by the turning element, and the holding pin of the turning element is received in the second through hole of the blocking element and corresponds to the supporting pin of the button.

2. The hinge assembly as claimed in claim 1, wherein the central shaft comprises a main body and a connecting head, and the outer screw thread is formed at a peripheral surface of the connecting head.

3. The hinge assembly as claimed in claim 2, wherein the main body comprises a main portion and an end portion, the main portion is cylindrical and adjoins the connecting head, and a peripheral surface of the end portion has a keyed configuration such that it engages in the first through hole of the blocking element and cannot rotate relative to the blocking element.

4. The hinge assembly as claimed in claim 1, wherein a first end of the central shaft defines a fixing groove.

5. The hinge assembly as claimed in claim 4, further comprising a fixing clip fixed in the fixing groove of the central shaft.

6. The hinge assembly as claimed in claim 1, wherein the turning element comprises a first portion and a second portion, the first portion defines a second central hole, the second portion defines the first central hole, and the first central hole is coaxial and in communication with the second central hole.

7. The hinge assembly as claimed in claim 6, wherein a step is formed where the first portion adjoins the second portion, and the second end of the first elastic means is supported by the step.

8. The hinge assembly as claimed in claim 6, wherein the first portion defines a receiving socket, and the holding pin of the turning element is received in the receiving socket.

9. The hinge assembly as claimed in claim 8, wherein the turning element further comprises a second elastic means received in the receiving socket of the first portion, the holding pin comprises a flange, a first end of the second elastic means is supported by the flange of the holding pin, and a second end of the second elastic means is supported by a bottom of the receiving socket.

10. The hinge assembly as claimed in claim 6, wherein a protuberance is formed on an outer surface of the second portion.

11. The hinge assembly as claimed in claim 5, wherein the button further comprises a blocking board and a head, the head extends from a first surface of the blocking board, the supporting pin extends from a second surface of the blocking board, the head defines a first central through hole, the blocking board defines a second central through hole, and the first central through hole is coaxial and in communication with the second central through hole.

12. The hinge assembly as claimed in claim 11, further comprising a third elastic means, wherein a step is defined where the first central through hole adjoins the second central through hole of the button, the third elastic means is received in the second central through hole and receives the end portion of the central shaft, a first end of the third elastic means is supported by the step of the button, and a second end of the third elastic means is supported by the fixing clip.

13. A foldable electronic device comprising a cover, a body and a hinge assembly, the hinge assembly comprising:
   a central shaft, comprising an outer screw thread at a second end thereof;
   a turning element, comprising a first central hole and a holding pin, an inner screw thread formed at an inner surface of the turning element in the first central hole;
   a first elastic means;
   a blocking element, defining a first through hole and a second through hole; and
   a button, comprising a supporting pin;
   wherein the central shaft extends through the first central hole of the turning element, the first elastic element, and the first through hole of the blocking element in that order, the outer screw thread of the central shaft engages with the inner screw thread of the turning element, a first end of the first elastic means is supported by the blocking element, a second end of the first elastic means is supported by the turning element, and the holding pin of the turning element is received in the second through hole of the blocking element and corresponds to the supporting pin of the button.

14. The foldable electronic device as claimed in claim 13, wherein the turning element is received in the cover of the mobile phone and can move along a rotational axis of the hinge assembly, and the blocking element is fixed in the body of the mobile phone.

15. The foldable electronic device as claimed in claim 13, wherein the turning element is received in the body of the mobile phone and can move along a rotational axis of the hinge assembly, and the blocking element is fixed in the cover of the mobile phone.

16. A hinge assembly for joining components of an electronic device, comprising:

a central shaft attached to one of said components and movable together therewith, an outer screw thread being formed on said central shaft;

a turning element receiving said central shaft therein, said turning element attached to another of said components and movable together therewith, and rotatable about said central shaft and axially movable along said central shaft, rotation of said turning element about said central shaft and axial movement of said turning element along said central shaft performing simultaneously, said rotation and axial movement of said turning element being guided by said outer screw thread of said central shaft;

a blocking element used to engage with said turning element so as to confine said rotation and axial movement of said turning element; and a button used to disengage said blocking element from said turning element so as to release said turning element and allow said rotation and axial movement of said turning element.

17. The hinge assembly as claimed in claim 16, wherein at least one holding pin is attached to said turning element so as to have said turning element engaging with said blocking element via said at least one holding pin.

18. The hinge assembly as claimed in claim 16, further comprising a first elastic means, wherein a first end of the first elastic means is supported by said blocking element, and a second end of the first elastic means is supported by said turning element.

19. The hinge assembly as claimed in claim 17, wherein said button comprises at least one supporting pin, and said at least one holding pin of said turning element corresponds to said at least one supporting pin of said button.

20. The hinge assembly as claimed in claim 16, wherein an inner screw thread is formed on an inner surface of said turning element, and said outer screw thread of said central shaft movably engages with said inner screw thread of said turning element.

* * * * *